United States Patent [19]
Williams et al.

[11] Patent Number: 5,558,027
[45] Date of Patent: Sep. 24, 1996

[54] SELF CONTAINED SAFE CASTER SYSTEM

[76] Inventors: B. Arvell Williams; J. Chad Williams, both of P.O. Box 5249, Amarillo, Tex. 79119-5249

[21] Appl. No.: 392,487

[22] Filed: Feb. 23, 1995

[51] Int. Cl.$^6$ ...................................................... E05G 1/00
[52] U.S. Cl. ................... 109/45; 16/32; 109/47; 280/43.2
[58] Field of Search ................ 109/45, 47, 51, 109/56, 57; 16/32, 19, 33, 34; 312/351.11, 351.13, 249.8; 280/43.2, 43.13; 248/650

[56] References Cited

U.S. PATENT DOCUMENTS

| | | | |
|---|---|---|---|
| 554,832 | 2/1896 | Partridge | 16/19 |
| 1,191,331 | 7/1916 | Meilink | 109/79 |
| 1,417,640 | 5/1922 | Sterner . | |
| 1,626,819 | 5/1927 | Hazlett | 16/33 |
| 1,884,636 | 10/1932 | Faus . | |
| 1,990,118 | 2/1935 | Ellis | 280/43.13 |
| 2,002,455 | 5/1935 | Schwerin | 280/44 |
| 2,309,214 | 1/1943 | Rey | 16/34 X |
| 2,358,007 | 9/1944 | Henley | 16/99 |
| 2,572,348 | 10/1951 | Johnson | 280/43 |
| 2,803,510 | 8/1957 | Carbary | 312/253 |
| 2,841,410 | 7/1958 | Kessler, Jr. et al. | 312/351.11 X |
| 3,534,430 | 10/1970 | Kesling et al. | 16/34 |
| 4,559,880 | 12/1985 | Lacka | 109/59 R |
| 4,596,232 | 6/1986 | Dowding | 126/126 |
| 4,668,029 | 5/1987 | Maizlish et al. | 312/250 |
| 4,783,879 | 11/1988 | Weaver | 16/34 |
| 4,861,049 | 8/1989 | Losi | 280/43.2 X |
| 4,866,963 | 9/1989 | Leininger et al. | 292/DIG. 32 X |
| 5,347,680 | 9/1994 | Rippe | 16/19 |

FOREIGN PATENT DOCUMENTS

| | | | |
|---|---|---|---|
| 4283103 | 10/1992 | Japan | 16/19 |
| 6460 | of 1905 | United Kingdom | 16/32 |

*Primary Examiner*—Lloyd A. Gall
*Attorney, Agent, or Firm*—C. J. Husar

[57] ABSTRACT

The disclosure relates to a retractable caster assembly for use on large safes weighing in the 1000 pound range and above. The caster assembly utilizes a plurality of retractable casters which can be lowered to permit moving a safe from one place to another. Once the safe has been moved to its desired location, the caster assembly is raised while the safe is simultaneously lowered to the building floor. The caster assembly eliminates the need for specialized equipment to move the safe. Once the safe is lowered and the caster assembly is retracted, it is totally hidden from view, thus preventing the unauthorized movement of the safe since access to the caster assembly is only available when the safe door is open.

12 Claims, 4 Drawing Sheets

SELF CONTAINED SAFE CASTER SYSTEM

BACKGROUND OF THE INVENTION

There are presently known safes which are provided with casters or wheels that permit a safe to be moved from one place to another within a particular room or to be moved from one building location to another remotely located building. The relocation of the safe takes place by merely rolling the Safe from one place to another.

In some instances, larger safes are moved with the use of pallet jacks or in the case of still larger safes, forklifts are used to lift and carry the safe from one place to another. However, it can readily be seen that the use of a forklift is limited by the structural strength of the building floors and also the size of the various openings which the forklift and safe will have to passe through in removing it from a building and also the building where it is to be located after the move.

Further, the known prior art safes which are equipped with wheels or casters provide a means whereby the entire safe is subject to theft by allowing for the unauthorizd removal of the entire safe and its contents through use of the wheels or casters.

With respect to large safes, i.e. safes in the 1000 to 1200 pound and up range, there has long been a need for a system whereby a large safe can readily be moved from one location to another without subjecting the safe to the possibility of theft or the requirement that a forklift, or other specialized equipment is needed to make the move from one location to another.

SUMMARY OF THE INVENTION

In view of the above noted deficiencies of known prior art safes, applicants have designed a system for large heavy safes which includes a plurality of retractable casters that can be conveniently lowered for movement of the safe and subsequently raised after placing the safe in the desired location. Upon raising the casters, the safe floor is raised with the casters and the entire safe is simultaneously lowered onto the building floor while the casters are hidden from view within the confines of the four walls of the safe. Access to the adjusting mechanism for raising and lowering of the safe is only permitted through the inside of the safe, i.e. the door of the safe must be opened to gain access to the caster elevating mechanism.

Once the safe is placed, the wheels are retracted through the use of a wrench or ratchet and socket. When the wheel system is retracted, the safe is simultaneously lowered onto the floor and the wheels or casters are totally hidden from view. Theft of the safe will be significantly deterred, if not made totally imposssible, due to the weight of the safe and the fact that the safe is now resting flush on the floor with the raised casters out of view. The base of the four walls are now in contact with the building floor.

In addition to the concealment of the casters by the walls of the safe, the four walls also serve to present a flush outer surface to the building floor without any openings to prevent the entrance of a floorjack, forklift or other device under the safe to serve as a further anti-theft deterrent.

OBJECTS OF THE INVENTION

An object of the invention is to provide a large safe with a caster system that permits convenient moving of the safe without the known deficiencies of the prior art.

Another object of the invention is to provide a retractable caster system which is hidden from view when in the retracted position.

Yet another object of the invention is to provide a retractable caster system that lowers the safe when the casters are retracted.

A still further object of the invention is to provide a retractable safe caster system which is accessible only when the door of the safe is open.

Another object of the invention is to provide a retractable safe caster system which allows for greater weight distribution of the safe weight than found in conventional fixed caster systems.

Yet another object of the invention is to provide a retractable safe caster system which presents a totally flush outward appearance without any openings thus providing a much desired anti-theft feature.

These and other objects of the instant invention will become more apparent hereinafter. The instant invention will now be described with particular reference to the accompanying drawings which form a part of the specification wherein like reference characters designate corresponding parts in the several views.

DETAILED DESCRIPTION OF THE DRAWINGS

Figure 1:
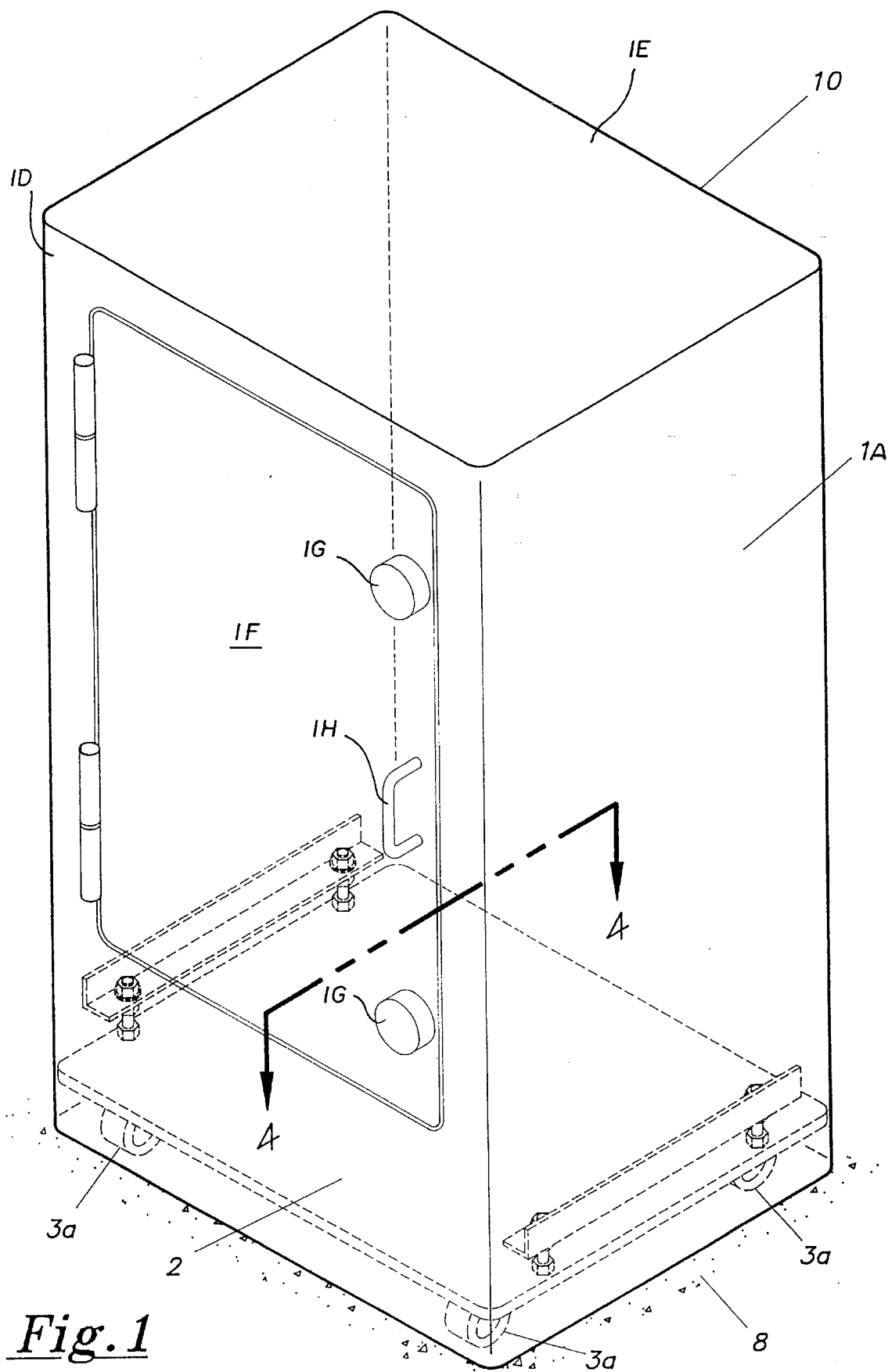
FIG. 1 is a perspective view of the novel safe with the retractable safe caster system and safe floor shown in dashed lines.

Referring now to FIG. 1, there is shown a perspective view of a safe indicated generally by reference numeral 10. Safe 10 includes four side walls 1A, 1B, 1C and 1D and top surface 1E. Front wall 1D includes door 1F, handle 1H and two combination locks 1G. As can be seen in this view, the four walls 1 of safe 10 extend to the building floor 8. As indicated earlier, the subject invention is directed primarily to larger safes, i.e. safes that weigh in the 1000 pound range and above. A system such as this on the lighter weight safes would not afford the required degree of protection since a lighter weight safe could be possibly physically picked up and carried away.

By means of walls 1 extending to and engaging building floor 8, the weight of safe 10 is supported by the four walls 1 which are typically ⅜ inches thick. Thus it can readily be seen that the thickness of the walls times the sum of the lengths of the walls divided into the weight of safe 10 provides a much better weight distribution ratio and a much lesser concentration of weight than would be the case where the entire safe weight is supported by approximately 4 square inches, i.e. the approximate one square inch of contact area per caster wheel as found in conventional caster supported safes.

Figure 2:
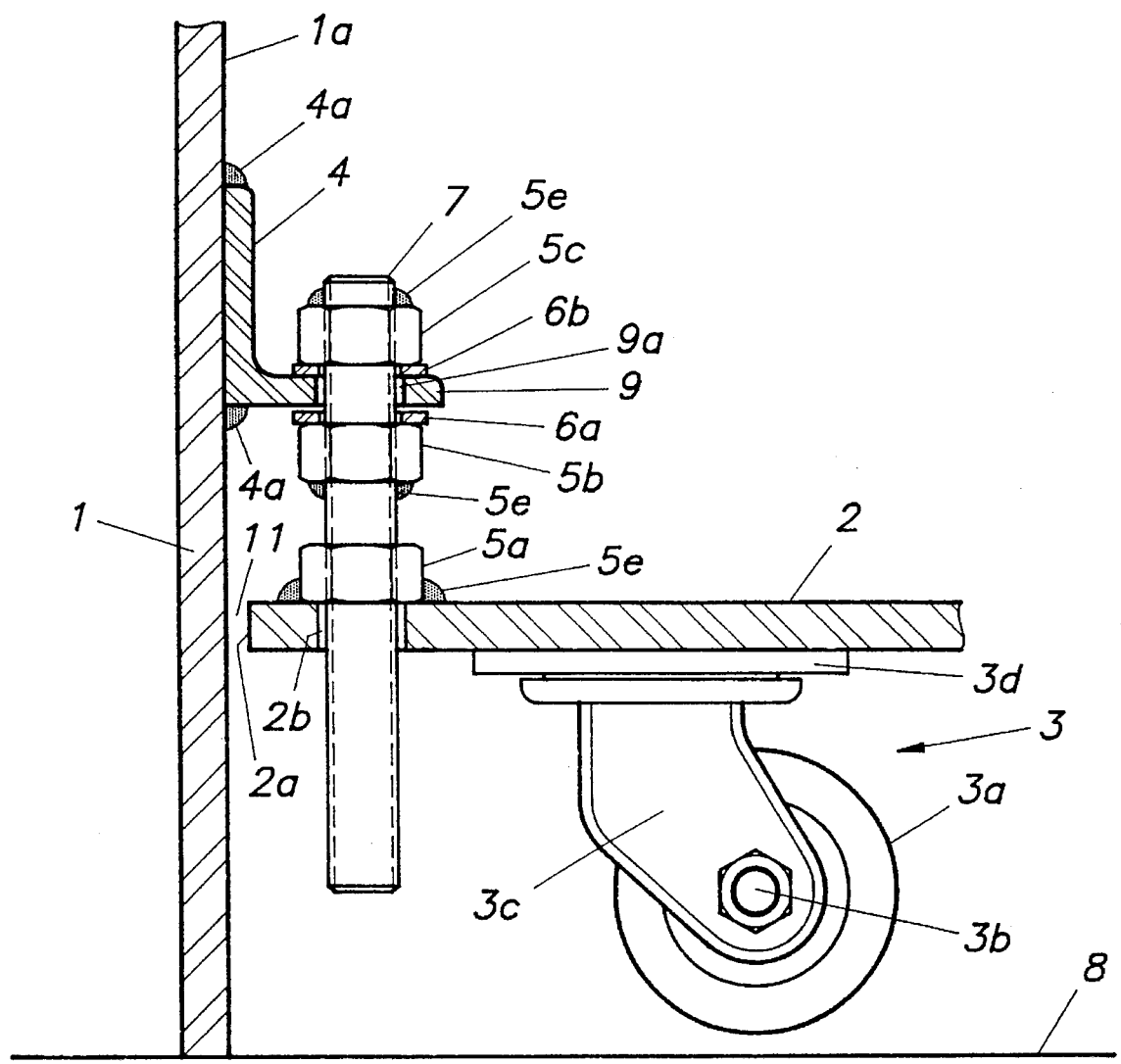
FIG. 2 is a detailed sectional view of one of the adjustable casters in its raised position.

Turning now to FIG. 2, there is shown a partial sectional view of the adjustable caster assemblies 3 with caster roller 3a in its raised position off the building floor 8 and safe wall 1 in contact with the building floor 8. The adjustable caster assembly 3 consists of a pair of angle iron support members 4 which are secured by welding to the inner surface 1a of a pair of opposite walls 1. As shown, an upper and lower weld bead 4a secures angle iron support member 4 to wall 1. Although not shown in this view, a second adjustable caster assembly 3 is mounted near the opposite end of angle iron support member 4. The horizontal leg 9 of angle iron support member 4 is provided with a bore 9a therethrough. Bore 9a is unthreaded and of sufficient diameter to permit bolt 7 to pass therethrough without any interference. Bolt 7 includes a pair of nuts 5b and 5c which are located below and above horizontal leg 9, respectively. Each nut 5b and 5c is provided with a washer 6a and 6b, respectively, below and above horizontal leg 9. Nuts 5c and 5b are each welded to bolt 7 to prevent their travelling up and down bolt 7 as it is rotated. Spaced below nut 5b is a third nut 5a which is welded to safe floor 2 and concentrically positioned relative to bore 2b. Bolt 7 is threaded into nut 5a and passes freely through unthreaded bore 2b. Thus it can be seen that by turning nut 5c clockwise, bolt 7 is also rotated, and by rotating bolt 7 within non-rotatable nut 5a, safe floor 2 is forced to travel upwards relative to bolt 7. Bolts 7, which are threaded their full length, are typically approximately one inch in diameter to provide sufficient strength to support the load. However, the bolt diameter can be changed depending upon the weight to be supported.

As safe floor 2 is raised, it carries caster assembly 3 and roller 3a upwards with it and simultaneously lowers safe walls 1A, 1B, 1C and 1D into contact with building floor 8. It is to be understood that the raising and lowering process is a slow process due to fact that the additional three caster rollers 3 must alternately be raised in incremental fashion.

Figure 3:
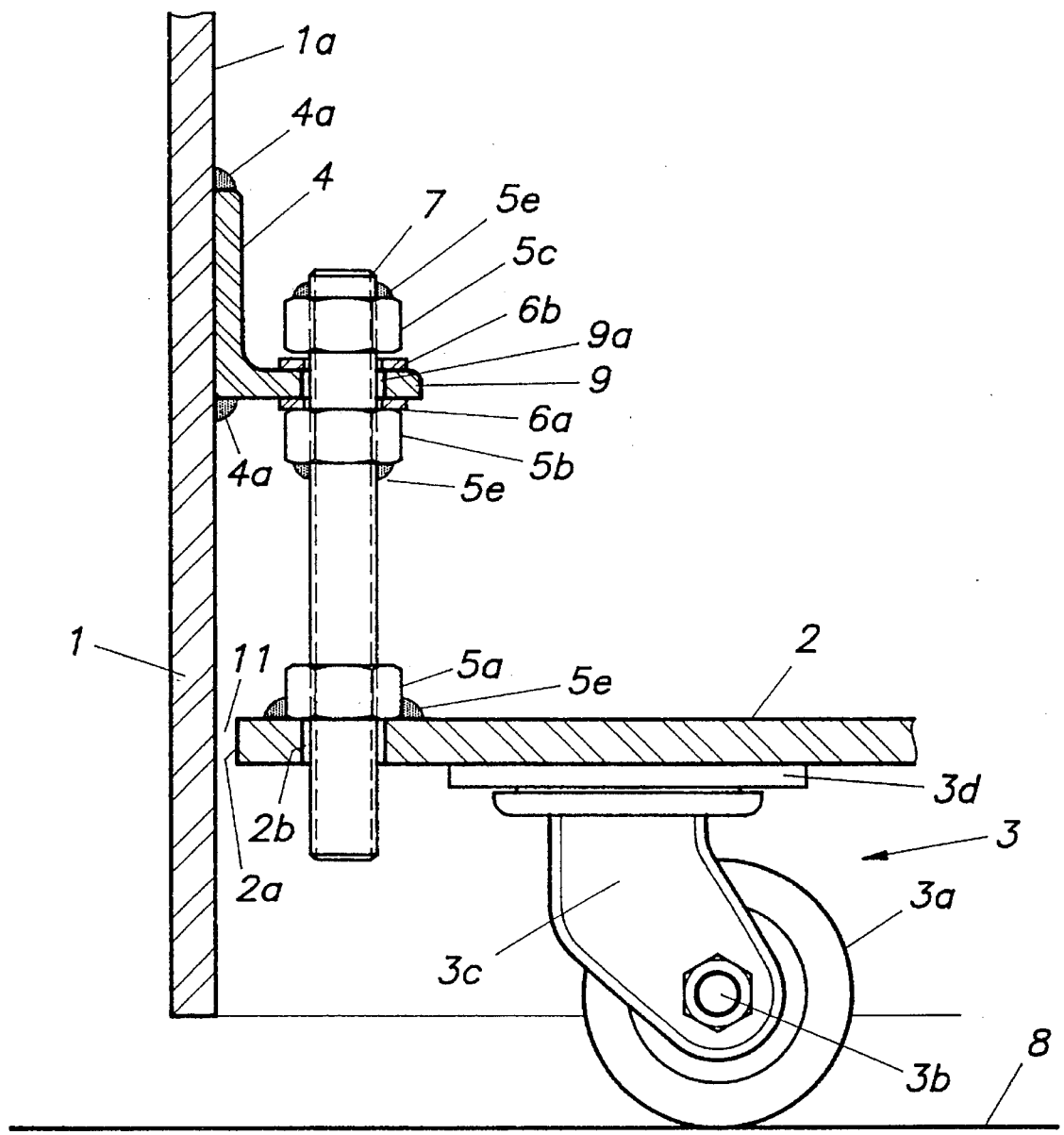
FIG. 3 is a detailed sectional view of one of the adjustable casters in its lowered position.

Referring now to FIG. 3, there is shown another partial sectional view similar to that of FIG. 2. However, FIG. 3 is an illustration of the caster assembly 3 with roller 3a in its lowered position contacting building floor 8. As can be seen in this figure, counterclockwise rotation of bolt 7 forces nut 5a to travel down bolt 7 since nut 5a cannot rotate due to weld bead 5e which secures it to safe floor 2. As nut 5a moves downward, safe floor 2 and caster assembly 3 will likewise move downward until caster roller 3a comes into contact with building floor 8. With continued counterclockwise rotation of bolt 7, the reaction of roller 3 with building floor 8 will start the raising of safe walls 1A, 1B, 1C and 1D off building floor 8. Continued rotation of bolt 7 in the same direction forces bolt 7 to continue its upward travel and since horizontal leg 9 is captured between nuts 5b and 5c, further upward extension of bolt 7 will raise safe walls 1A, 1B, 1C and 1D off building floor 8. As indicated earlier, the raising and lowering process is time consuming since bolts 7 must be rotated incrementally in sequential fashion. The purpose of the sequential turning of bolts 7 is to maintain safe 10 in as level a position as possible during the raising and lowering procedure.

Shown again here in FIG. 3 is gap 11, which is the distance or clearance between edge 2a of safe floor 2 and inside surface 1a of wall 1. This clearance gap 11 insures interference free raising and lowering of safe floor 2 and also allows the safe to "breathe", thus eliminating the dusky smell which is commonly found in units not provided with such a gap 11. At the same time, these gaps 11 are located and sized so that they inherently provide for maximum protection against dust accumulation within the body of safe 10. Their location at the bottom of the safe also provides minimum exposure to rising heat and flames in the event of a fire unless the fire originates directly underneath safe 10.

Figure 4:
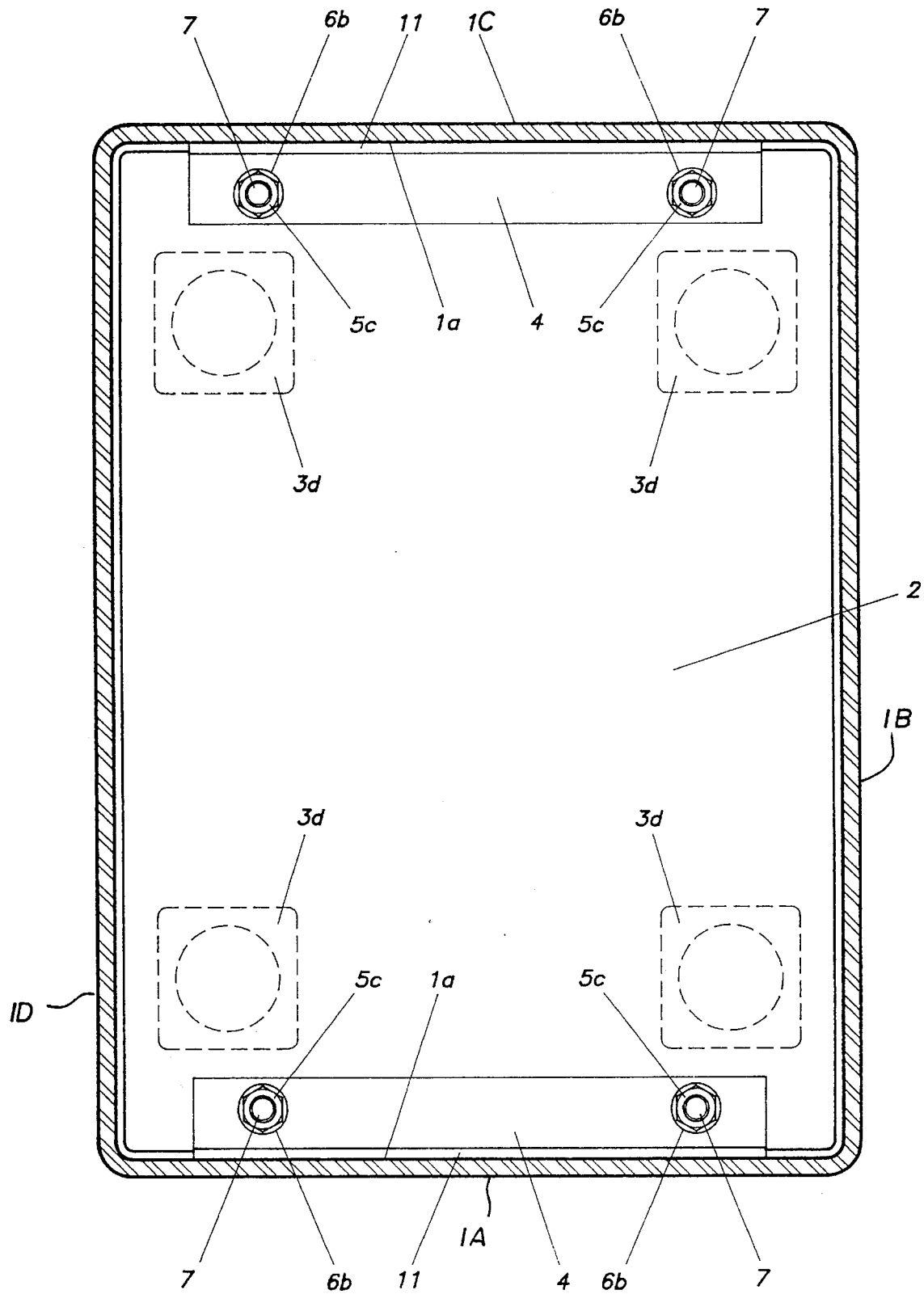
FIG. 4 is a sectional view, taken along the plane 4—4 of FIG. 1 showing the location of the four adjustable casters.

Turning now to FIG. 4, there is shown a sectional view which was taken along the plane 4—4 of FIG. 1. Safe floor 2 is shown with four caster assemblies 3 shown in dashed lines since they are hidden beneath safe floor 2. Also shown are two angle iron support members 4 which are welded to opposite interior surface 1a of wall 1A. Further, adjusting nuts 5c are illustrated in conjunction with their respective bolts 7.

Although four caster assemblies 3 and two angle iron support members 4 are shown, additional caster assemblies and angle iron support members 4 may be utilized depending upon the weight of the safe 10 being supported. The caster assemblies 3 which are utilized are of the conventional heavy duty variety which include a roller 3a supported by axle 3b and is mounted between fork member 3c which is interconnected to plate 3d. Plate 3d in turn is fixedly mounted to the underside of safe floor 2. It is possible for all four caster assemblies 3 to be of the swivel type. However, it has been found that when two of the caster assemblies 3 are of the fixed type, with the remaining two caster assemblies 3 being of the swivel type they will generally perform satisfactorily.

Further, bolts 7 are also heavy duty in size which is approximately one inch in diameter. Larger diameter bolts may be used if found necessary. Bolts 7 are considered to be a critical component of the height adjusting mechanism since it is the bolts 7 which supports the entire weight of the safe 10 when caster assemblies 3 are in their lowered position. If so desired, plastic covers (not shown) could be provided to cover the uppermost ends of projecting bolts 7 or a false bottom shelf may be fitted to provide a neat appearance to the interior of the safe 10. Of course, the covers or shelf would have to be removed and replaced after moving of the safe is completed.

Although the specification discloses the novel caster assembly in conjunction with a large safe, it is to be understood that the subject application can find other uses, for example, large tool chests, furniture such as large bedroom dressers or any other larger unit having a floor therein. It can readily be seen that a retractable caster system such as that disclosed herein has potentially a host of uses in addition to that which is specifically disclosed and applicant does not wish to be limited to a large safe exclusively.

While the invention has been described in its preferred embodiment, it is to be understood that the words which have been used are words of description rather than limitation and that changes may be made within the purview of the appended claims without departing from the full scope or spirit of the invention.

Having thus described our invention, We claim:

1. The combination of retractable caster assemblies and a large portable enclosure;

said large portable enclosure including a plurality of oppositely disposed parallel side walls;

an upper top surface interconnected with said plurality of side walls forming an enclosure;

access means provided in one of said plurality of oppositely disposed side walls for controlling access to said enclosure;

a planar enclosure floor positioned within said enclosure walls;

height adjusting means comprising a pair of angle iron support members secured to a pair of said oppositely disposed side walls;

each of said pair of angle iron support members including a pair of spaced bolts, each of said bolts having a first end extending through unthreaded bores in each of said angle iron support members and a second opposite end extending through a pair of unthreaded bores in said floor;

said first end of each of said bolts having a pair of nuts fixedly secured thereto with one nut located above and the other nut located below said ankle iron support member thereby capturing said angle iron support member therebetween;

a third nut fixedly secured to the upper surface of said floor in coaxial alignment with each of said pair of spaced bores in said enclosure floor with said second end of said bolt threaded through said third fixed nut and rotation of the uppermost nut secured to said bolt causes said enclosure floor and a plurality of caster assemblies to be lowered or raised depending upon the direction of rotation;

said plurality of caster assemblies operably secured beneath said enclosure floor whereby said caster assemblies can be lowered onto a supporting surface to permit said enclosure to be rolled thereover without the need for any specialized moving equipment such as a floorjack or forklift.

2. The combination of retractable caster assemblies and an enclosure as defined in claim 1 wherein said enclosure floor is a horizontal planar member which is spaced from said plurality of side walls to form a gap around its entire periphery between the interior surfaces of said oppositely disposed side walls and the peripheral edges of said enclosure floor thus allowing interference free vertical movement of said enclosure floor relative to said side walls when said caster assemblies are raised relative to a supporting surface.

3. The combination of retractable caster assemblies and an enclosure as defined in claim 2 wherein said gap between said plurality of side walls and the periphery of said enclosure floor allows said enclosure to breathe and permit circulation of air within said enclosure thus eliminating any offensive odors therein.

4. The combination of retractable caster assemblies and a large portable enclosure as defined in claim 1 wherein said enclosure is a large safe.

5. The combination of retractable caster assemblies and an enclosure as defined in claim 4 wherein said large safe is entirely supported by engagement of said plurality of side walls with a supporting surface and said caster assemblies are hidden from view when said caster assemblies are raised off a supporting surface.

6. The combination of retractable caster assemblies and a large portable enclosure as defined in claim 1 wherein said enclosure is a large tool chest.

7. The combination of retractable caster assemblies and an enclosure as defined in claim 1 wherein rotation of said uppermost nut in a given direction first causes lowering of said enclosure to a supporting surface and continued subsequent rotation of said nut in the same direction will cause a raising of said caster assemblies off a supporting surface thus hiding the caster assemblies from view when said enclosure is resting on a supporting surface.

8. The combination of retractable caster assemblies and an enclosure as defined in claim 7 wherein rotation of said nut in an opposite direction will first cause said enclosure floor and caster assemblies to be lowered into engagement with a supporting surface and subsequent continued rotation in the same direction will raise the entire enclosure off a supporting surface, allowing said enclosure to be rolled thereover.

9. A self contained retractable caster system and a large safe comprising in combination:

said safe including a plurality of parallel oppositely disposed side walls;

a planar top surface interconnected with said plurality of side walls forming an enclosure;

entrance means including a door, handle and combination means positioned on one of said plurality of side walls for gaining access to the interior of said enclosure;

height adjusting means operably connected to an interior surface of at least two of said plurality of side walls;

a safe floor connected to said height adjusting means and movable in response to adjustments made to said height adjusting means; caster assemblies secured to an undersurface of said safe floor;

said height adjusting means including at least a pair of angle iron support members with horizontal leg portions;

a pair of spaced bores in each of said horizontal leg portions;

a plurality of spaced bores in said safe floor in coaxial alignment with said spaced bores in said horizontal leg portions;

a plurality of elongated threaded bolts having a first and second nut spaced from each other and securely fastened thereto; one of said plurality of bolts being received in each of said spaced bores of said horizontal leg portions; a third nut fixedly mounted to said safe floor and in coaxial alignment with each of said bores in said safe floor; said elongated bolts threadedly received in each of said third nuts and rotation of said elongated bolts in a given direction will raise said safe floor and said caster assemblies off a supporting surface and permit said safe walls to rest on a supporting surface with said caster assemblies hidden from view;

whereby said caster assemblies can be lowered into engagement with a supporting surface to permit rolling movement of said safe without the use of any specialized equipment such as a floorjack or forklift.

10. A self contained retractable caster system and a large safe as defined in claim 9 wherein said caster assemblies comprises four spaced caster assemblies.

11. A self contained retractable caster system and a large safe as defined in claim 10 wherein two of said four spaced caster assemblies are of the swivel type.

12. A self contained retractable caster system and a large safe as defined in claim 10 wherein two of said four caster assemblies are of the fixed type.

* * * * *